(12) United States Patent
Yu

(10) Patent No.: US 8,860,929 B2
(45) Date of Patent: Oct. 14, 2014

(54) HIGH PRECISE LASER RANGEFINDER

(75) Inventor: Chen-Yu Yu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 32 days.

(21) Appl. No.: 13/594,844

(22) Filed: Aug. 26, 2012

(65) Prior Publication Data

US 2013/0286375 A1  Oct. 31, 2013

(30) Foreign Application Priority Data

Apr. 27, 2012 (TW) .............................. 101115062 A

(51) Int. Cl.
G01C 3/08 (2006.01)
(52) U.S. Cl.
USPC ......... 356/3.09; 356/3.01; 356/3.1; 356/4.01; 356/4.1; 356/5.01
(58) Field of Classification Search
CPC ..... G01S 7/4802; G01S 17/89; G06K 9/3241; G06K 9/00201; G01B 11/24; G01C 3/08
USPC ................................................ 356/3.01–28.5
See application file for complete search history.

(56) References Cited

U.S. PATENT DOCUMENTS 4,567,347 A * 1/1986 Ito et al. ................... 219/124.34

* cited by examiner

*Primary Examiner* — Luke Ratcliffe
(74) *Attorney, Agent, or Firm* — Novak Druce Connolly Bove + Quigg LLP

(57) ABSTRACT

A laser rangefinder includes a scanning laser emitter emitting a narrow laser beam, a controller in communication with the scanning laser emitter and configured to control the scanning laser emitter to emit the laser beam to scan a preset range in a preset manner, a laser detector positioned adjacent to the scanning laser emitter and configured to capture an image of a spot formed by the laser beam reflected off an object; and a processor in communication with the controller and the laser detector. The processor is configured to obtain an angle that the laser beam is tilted and process the image to obtain position coordinates of the spot in the image. The processor is further configured to calculate a distance from the laser rangefinder to the object based upon the angle and the position coordinates of the spot.

7 Claims, 3 Drawing Sheets

HIGH PRECISE LASER RANGEFINDER

BACKGROUND

1. Technical Field

The present disclosure relates to distance measurements and particularly to a laser rangefinder of high precision.

2. Description of Related Art

A laser rangefinder operates on the time of flight principle by sending a laser beam towards an object and measuring a time taken by the laser beam to be reflected off the object and returned to the laser rangefinder, thus determining a distance to the object. However, due to the high speed of light, this technique is not appropriate for high precision sub-millimeter measurements.

Therefore, it is desirable to provide a laser rangefinder, which can overcome the above-mentioned shortcomings

DETAILED DESCRIPTION

Embodiments of the disclosure will be described with reference to the accompanying drawings.

Figure 1:
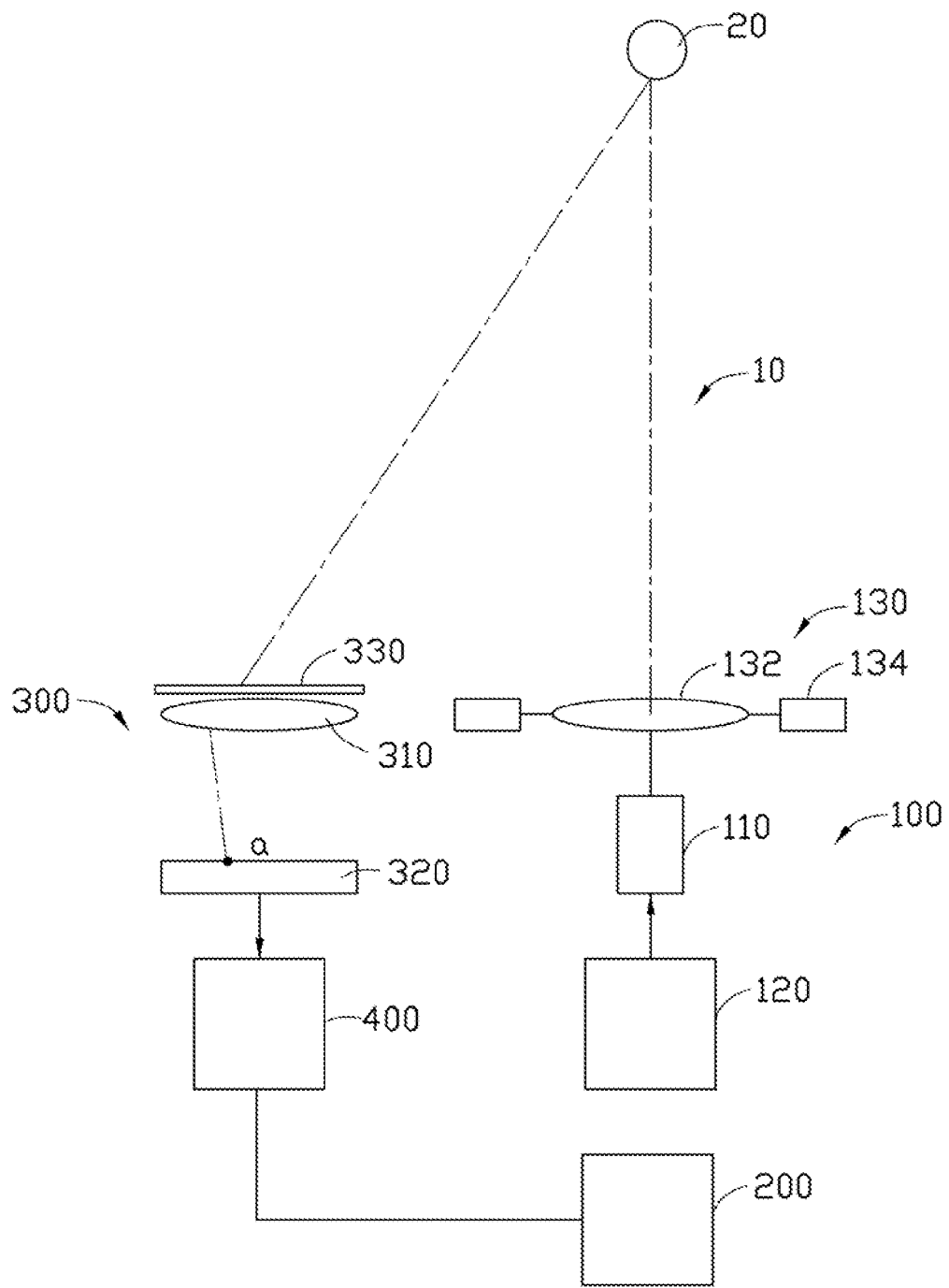
FIG. 1 is a schematic diagram of a laser rangefinder, according to an embodiment.

Referring to FIG. 1, a laser rangefinder 10, according to an embodiment, includes a scanning laser emitter 100, a controller 200, a laser detector 300, and a processor 400.

The laser emitter 100 includes a laser source 110, a driver 120, and a lens module 130.

The driver 120 drives the laser source 110, such as a laser diode, to emit a laser beam.

Figure 2:
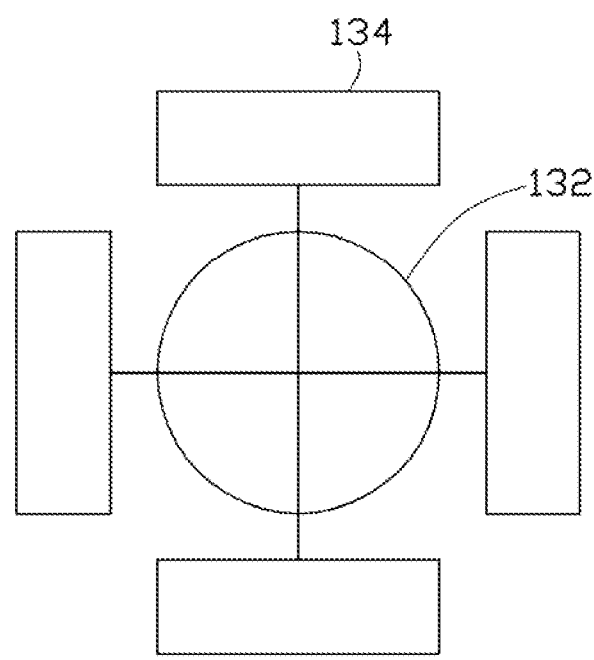
FIG. 2 is a schematic diagram of a lens module of a laser emitter of the laser rangefinder of FIG. 1.

Also referring to FIG. 2, the lens module 130 is a micro electro-mechanical system (MEMS) and includes a micro-lens 132 and two pairs of actuators 134.

The micro-lens 132 is positioned in a path of the laser beam and projects the laser beam along an optical axis of the micro-lens 132 (see FIG. 1).

Figure 3:
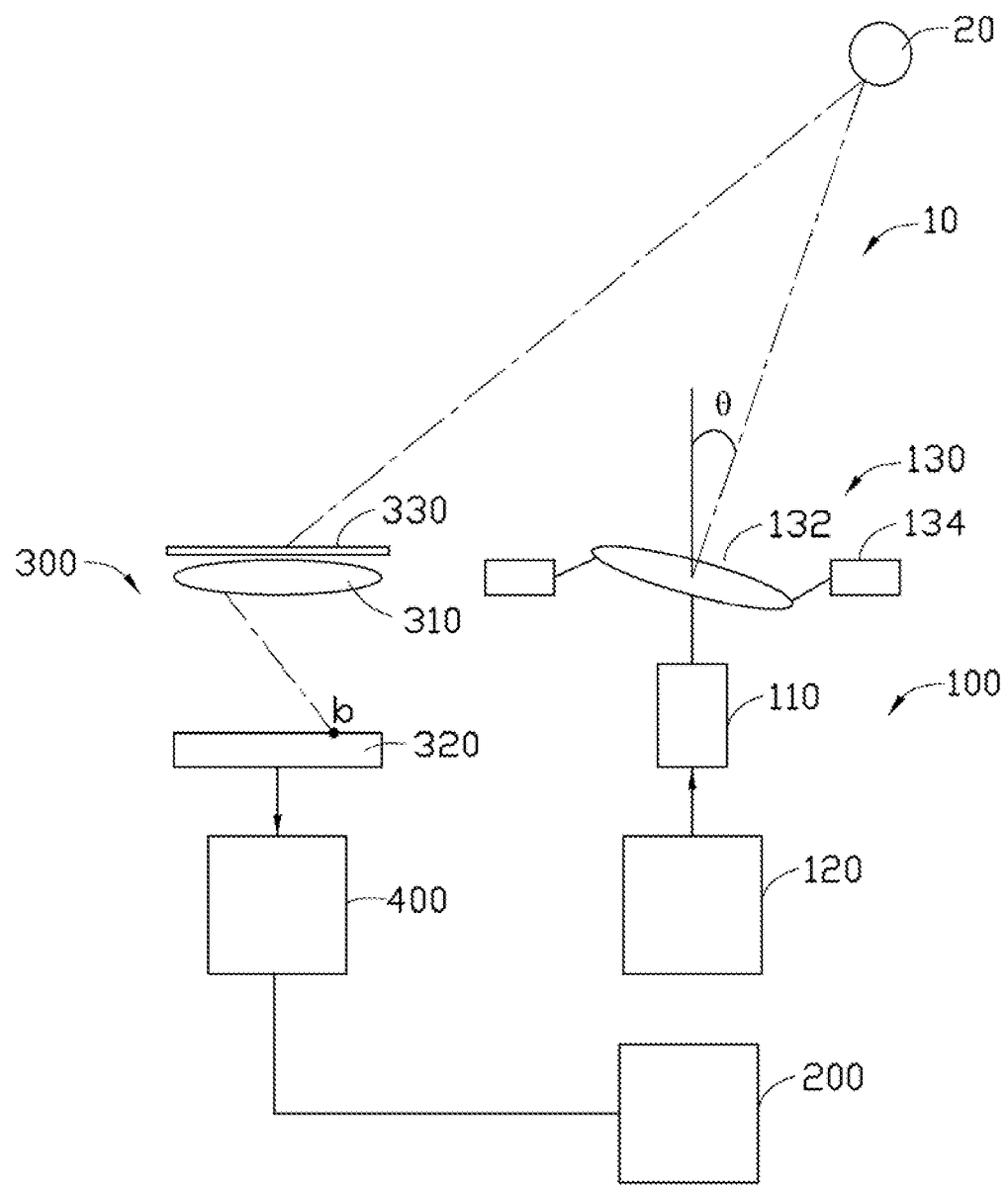
FIG. 3 is similar to FIG. 1, but the laser rangefinder is in another state of operation.

The actuators 134 are equidistantly arranged around the micro-lens 132 and connect to a circumferential part of the micro-lens 132. Each actuator 134 is configured to lift or lower the edge of the micro-lens 132 to which it is attached. When one actuator 134 in each pair lifts an edge, the other actuator 134 in the pair lowers the opposing edge of the micro-lens 132, thus cooperatively tilting the micro-lens 132 around a central axis of the micro-lens 132, about which the pair of the actuators 134 are symmetrically arranged (see FIG. 3). Connection lines of the two pairs of actuators 134 intersect at substantially a right angle. As such, the emitted beam points in a different direction as the optical axis of the micro-lens tilts with the micro-lens 132. In FIG. 1, a transmitting direction of the emitted beam is defined as a resting position (origin). In FIG. 3, the transmitting direction of the emitted beam tilts from the origin about an angle θ.

The controller 200 is in communication with the scanning laser emitter 100 and controls the actuators 134 to lift or lower the edges of the micro-lens 132 such that the emitted beam scans a preset range in a preset manner For example, if the maximum angle to which each pair of actuators 134 can tilt the micro-lens is about 30 degrees, then the preset range is up and down about 30 degrees, and left and right about 30 degrees. If the up and down actuators 134 tilt the micro lens 132 along a row or horizontal direction, the left and right actuators 134 tilt the micro-lens along a line or vertical direction, then the preset manner can be the up and down actuators 134 tilt the micro-lens 132 from up to down, and for each line, the left and right actuators 134 tilt the micro-lens 132 from left to right.

The laser detector 300, such as a camera module, is positioned adjacent to the scanning laser emitter and includes a lens 310 and an image sensor 320. The laser detector 300 also signals the controller 200 to stop the actuators 134 from moving when the reflected laser beam (reflected from an object 20) is detected in a current image. The reflected laser beam is received as a point or spot on the image sensor 320, for example, a spot "a" is detected in the image shown in FIG. 1 while another spot "b" is detected in the image shown in FIG. 3.

The processor 400 processes the current image to obtain position coordinates of the point or spot in the image and calculate a distance form the laser rangefinder 10 to the object 20 based upon the position coordinates of the spot in the image and the angle of tilt to which the emitted beam has been tilted in relation to the origin that is substantially parallel to an optical axis of the lens 310. For example, in FIG. 1, the position coordinates of the spot "a" is x1, and the angle of tilt is zero. In FIG. 3, the position coordinates of the spot "b" is x2, and the angle of tilt is θ.

In particular, the processor 400 pre-stores an index table including a collection of index tilt angles, a collection of groups of index position coordinates, and a collection of corresponding distances. Each of the distances corresponds with an index tilt angle and a group of index position coordinates. For example, the index table can be:

| Entry 1-Index Angle (θ) | Entry 2-Index position coordinates (x) | Result-Result Distance (db) |
| --- | --- | --- |
| θ1 | x1 | db11 |
| θ1 | x2 | db12 |
| ... | ... | ... |
| θ1 | xn | db1n |
| θ2 | x1 | db21 |
| ... | ... | ... |
| θ2 | xn | db1n |
| ... | ... | ... |
| θm | xn | dbmn |

The processor 400 calculates the distance db by indexing the index table and using interpolation, if needed. The index table can be determined by experiment.

The laser beam has a narrow bandwidth, and the laser detector 300 includes a bandpass filter 330 dedicated for allowing only a laser beam or reflected laser beam to pass. As such, the spot is sharper and brighter than any other portions of the image and thus the processing of the image (i.e., recognizing the point or spot in the image) is facilitated. The bandwidth of the laser beam can be centered at about 635 nm, 905 nm, and 1540 nm.

The cross-section of the laser beam has a certain geometric shape, such as round, elliptical, triangular, or square. The micro-lens 134 is an imaging lens and projects the laser beam without changing the geometric shape. As such, the spot reveals the same geometric shape, facilitating the processing of the image (i.e., recognizing the spot from the image).

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A laser rangefinder, comprising:
a scanning laser emitter configured to emit a laser beam;
a controller in communication with the scanning laser emitter and configured to control the scanning laser emitter to emit the laser beam to scan a preset range in a preset manner;
a laser detector positioned adjacent to the scanning laser emitter and configured to capture an image of a spot formed by the laser beam reflected off an object; and
a processor in communication with the controller and the laser detector, the processor being configured to obtain an angle that the laser beam tilts from its origin and process the image to obtain position coordinates of the spot in the image, the processor being further configured to calculate an distance from the laser rangefinder to the object based upon the angle and the position coordinates;
wherein the scanning laser emitter comprises a laser source, a driver, and a lens module, the driver is configured to drive the laser source to emit the laser beam, the lens module is positioned in a path of the laser beam, the controller controls the lens module to project the laser beam;
wherein the lens module is a micro electromechanical system and comprises a micro-lens and two pairs of actuators, the micro-lens is positioned in the path of the laser beam and configured for projecting the laser beam along an optical axis of the micro-lens, the actuators are equidistantly arranged around the micro-lens and connect to corresponding circumferential peripheral parts of the micro-lens, each actuator is configured to lift or lower the corresponding part of the micro-lens, when one actuator in each pair lifts the corresponding part, the other actuator in the pair lowers the corresponding part of the micro-lens, thus cooperatively tilt the micro-lens around a central axis of the micro-lens, about which the pair of the actuators are symmetrically arranged, and connection lines of the two pairs of actuators intersect at substantially a right angle.

2. The laser rangefinder of claim 1, wherein the laser source comprises a laser diode.

3. The laser rangefinder of claim 1, wherein the laser beam has a narrow bandwidth, the laser detector comprises a band-pass filter dedicating for only allowing the laser beam to pass therethrough and rejecting any other light.

4. The laser rangefinder of claim 1, wherein a cross-section of the laser beam has a certain geometric shape.

5. The laser rangefinder of claim 1, wherein the laser detector is configured to signal the controller to stop the actuators when a spot formed by the laser beam reflected off the object is detected in the image.

6. The laser rangefinder of claim 1, wherein the laser detector comprises a camera module.

7. The laser rangefinder of claim 1, wherein the processor pre-stores an index table including a collection of index angles, a collection of groups of index position coordinates, and a collection of result distances, each of the result distances is associated with an index angle and a group of index position coordinates, and the processor calculates the distance by indexing the index table.

* * * * *